H. GIBBS.
HOSE NOZZLE.
APPLICATION FILED MAY 24, 1915.

1,193,011.

Patented Aug. 1, 1916.

Witness:-
Louis W. F. Whitehead

Inventor:-
Henry Gibbs
By Pierce Fisher & Claff
Attys.

UNITED STATES PATENT OFFICE.

HENRY GIBBS, OF CHICAGO, ILLINOIS, ASSIGNOR TO W. D. ALLEN MANUFACTURING COMPANY, OF CHICAGO, ILLINOIS, A CORPORATION.

HOSE-NOZZLE.

1,193,011.      Specification of Letters Patent.      Patented Aug. 1, 1916.

Application filed May 24, 1915. Serial No. 30,224.

*To all whom it may concern:*

Be it known that I, HENRY GIBBS, a citizen of the United States, and a resident of the city of Chicago, county of Cook, and State of Illinois, have invented certain new and useful Improvements in Hose-Nozzles, of which I do declare the following to be a full, clear, and exact description, reference being had to the accompanying drawing, forming a part of this specification.

The present invention relates to that class of hose nozzles whereby the water from the hose can be cut off or so controlled that it will issue either in the form of coarse spray, fine spray, or in a solid stream.

The object of this invention is to provide a nozzle of simple, cheap construction which will nevertheless possess all of the advantages of tight packing found in the more expensive types of nozzle.

The invention consists in the features of novelty hereinafter described, illustrated in the accompanying drawing and particularly pointed out in the claims at the end of this specification.

Figure 1:
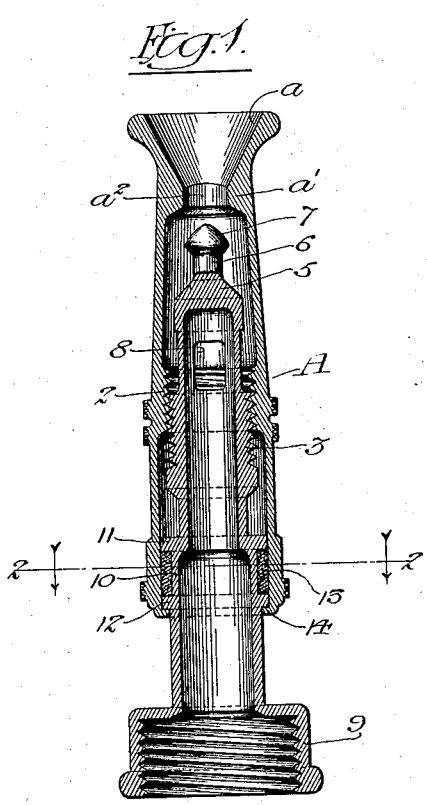
Figure 2:
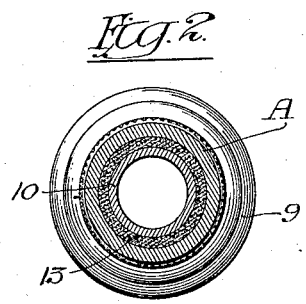

Figure 1 is a view in central longitudinal section through a nozzle embodying my invention. Fig. 2 is a cross section on the line 2—2 of Fig. 1.

In the accompanying drawing, A designates the body of the nozzle, the outer end of which is formed with a flaring portion *a* and an annular contracted portion *a'* having an opening *a²* therein, the annular contracted portion *a'* forming a seat for a valve, as will presently more fully appear. On its interior the body A is provided with an inwardly projecting portion 2 adapted to be engaged by the enlarged threaded portion 3 of a hollow spindle 4. On its outer end the spindle 4 is formed with a beveled portion 5 constituting a valve adapted to close against the inner portion of the valve seat *a'* adjacent the end of the body portion A, and from the valve 5 projects a stem 6 carrying at its outer end a double cone 7 of slightly smaller diameter than the opening *a²* at the end of the body A. Through the walls of the hollow spindle 4, adjacent its outer end, are formed the openings 8 through which the water will discharge, as it passes through the spindle. The opposite or inner end of the spindle 4 is provided with an integral expanded coupling portion 9 that is interiorly screw-threaded to permit it to be coupled to the end of the hose. At a point intermediate the threaded portion 3 and the expanded coupling portion 9 and at some distance from the latter, the spindle is provided with an enlarged portion having a wide groove 10 formed therein between two integral annular flanges 11 and 12. The outer portion of the body A is preferably slightly conical or tapered, but its inner portion is provided with a smooth, cylindrical bore and the flanges 11 of the spindle slidably fit therein. The groove or space between the flanges 11 and 12 and between the spindle and the body A form a packing chamber in which a body of wicking or like suitable packing 13 is confined.

It should be noted that in the preferred construction shown, the enlarged cylindrical bore at the inner end of the body and the flanges 11 and 12 of the spindle that fit within such bore, are at least equal to and are preferably slightly larger than the exteriorly threaded portion 3 of the spindle, so that the parts can be readily assembled by first placing the packing between the flanges 11 and 12 and then putting the spindle and the body portion in position by passing the same over the outer end of the spindle.

The body A is preferably formed of malleable cast metal and has a portion of reduced thickness at its extreme inner end which is spun or bent inwardly, after the parts are assembled, to form a stop flange which is arranged to abut against the flange 12 and limit the outward movement of the adjustable body portion A.

The invention affords an exceedingly cheap, simple and effective hose nozzle having means for cutting off and regulating the flow of water therethrough. By arranging the packing between rigid annular flanges on the spindle and spinning the end of the body around the lower flange, the packing is securely held in position to prevent leaking and will not be displaced by the rotating and longitudinal movements of the body portion. The arrangement obviates the necessity of employing a separate stuffing box or gland and securely locks the body on the spindle while permitting the relative adjustment thereof.

It will be readily understood by those familiar with this class of devices, that the variation of the stream of water can be readily effected in the usual manner by the adjustment of the body of the nozzle upon the spindle.

Having thus described my invention, what I claim as new, and desire to secure by Letters Patent, is:—

1. A hose nozzle, comprising a hollow spindle having an integral enlarged coupling at its inner end and a valve at its outer end, a hollow body portion mounted on said stem to shift longitudinally thereof and having a cylindrical bore at its inner end and a discharge opening at its outer end with which said valve coöperates, said spindle having, at a distance from its inner end, annular spaced flanges fitting within the cylindrical bore of said body portion, and said body portion having an integral inturned flange at its extreme inner end serving to connect said body portion and said spindle while permitting the relative longitudinal movement thereof, and a packing placed between said annular flanges and engaging the face of the cylindrical bore of said body portion, substantially as described.

2. A two-piece hose nozzle of the character described comprising an outer body having interior screw threads at a distance from its inner end and an enlarged cylindrical bore at its inner end, an inner hollow spindle having an exteriorly threaded portion at a distance from its inner end for engaging the interior screw threads of said body, said spindle having an integral, enlarged coupling at its inner end and being provided between said coupling and its screw threaded portion with integral, annular, spaced flanges of a diameter at least equal to said exteriorly threaded portion and fitting within the enlarged cylindrical bore of said body, and a packing placed between said annular flanges, said body having an integral, inturned flange at its extreme inner end arranged to engage the lower flange of said spindle and limit the relative movement of said body and said spindle, substantially as described.

HENRY GIBBS.

Witness:
J. G. ANDERSON.

Copies of this patent may be obtained for five cents each, by addressing the "Commissioner of Patents, Washington, D. C."